United States Patent
Douglas et al.

(10) Patent No.: US 10,280,847 B2
(45) Date of Patent: May 7, 2019

(54) METHOD FOR RETRACTING A PARTIALLY EXTENDED SLIDING CAMSHAFT ACTUATOR PIN

(71) Applicant: GM GLOBAL TECHNOLOGY OPERATIONS LLC, Detroit, MI (US)

(72) Inventors: Scot A Douglas, Howell, MI (US); Douglas R Verner, Sterling Heights, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 224 days.

(21) Appl. No.: 15/472,408

(22) Filed: Mar. 29, 2017

(65) Prior Publication Data

US 2018/0283227 A1    Oct. 4, 2018

(51) Int. Cl.
| | |
|---|---|
| *F01L 1/34* | (2006.01) |
| *F02D 13/02* | (2006.01) |
| *F01L 13/00* | (2006.01) |
| *F01L 1/053* | (2006.01) |
| *F01L 1/18* | (2006.01) |

(52) U.S. Cl.
CPC ......... *F02D 13/0223* (2013.01); *F01L 1/053* (2013.01); *F01L 13/0036* (2013.01); *F02D 13/0207* (2013.01); *F01L 1/185* (2013.01); *F01L 2001/0537* (2013.01); *F01L 2013/0052* (2013.01); *F01L 2013/101* (2013.01); *F01L 2105/00* (2013.01); *F01L 2820/02* (2013.01); *F01L 2820/041* (2013.01)

(58) Field of Classification Search
CPC ... F01L 1/34; F01L 1/185; F01L 1/053; F01L 1/047; F01L 13/0036; F01L 13/0223; F01L 2013/0052; F01L 2013/101; F01L 2001/0537; F01L 2105/00; F01L 2820/02; F01L 2820/041
See application file for complete search history.

(56) References Cited

U.S. PATENT DOCUMENTS 8,925,504 B2 *   1/2015   Tsuzuki ................ F01L 1/185
                                              123/90.16

\* cited by examiner

*Primary Examiner* — Zelalem Eshete (57) ABSTRACT

A method for retracting a partially extended pin of a sliding camshaft actuator having first and second pins being selectively actuatable by adjacent first and second magnetic field generating coils includes determining if the first or the second pin is partially extended after engine ignition. A partially extended first pin is retracted with flux linkage created by the second magnetic field generating coil being coupled unto the first magnetic field generating coil, and a partially extended second pin is retracted with flux linkage created by the first magnetic field generating coil being coupled unto the second magnetic field generating coil.

15 Claims, 8 Drawing Sheets

METHOD FOR RETRACTING A PARTIALLY EXTENDED SLIDING CAMSHAFT ACTUATOR PIN

TECHNICAL FIELD

The present invention generally relates to sliding camshaft actuators for variable valve lift (VVL) systems, and more particularly relates to a method for retracting a partially extended sliding camshaft actuator pin.

BACKGROUND

Internal combustion engines include intake and exhaust valves that can be actuated by cam lobes of at least one camshaft. In some configurations the camshafts are constructed with sliding camshaft assemblies having multiple steps for varying the lift distance of an engine valve. For example, a two-step sliding camshaft may include a high lift cam lobe position for lifting an engine valve to a maximum distance, and a low lift cam lobe position for lifting the engine valve below the maximum lift distance.

At least one sliding camshaft actuator is fixed on an internal combustion engine for changing position between the multiple cam lobes. Particularly, at least one actuator pin of a camshaft actuator is operative to selectively engage displacement grooves configured on the periphery of camshaft barrels formed on the sliding camshaft assembly. As the camshaft assembly rotates, an actuator pin is selected to move into a displacement groove of the camshaft barrel which causes the sliding camshaft assembly to shift into a different position along the camshaft axis. When a sliding camshaft shifts position, the intake and/or exhaust valves are actuated differently in accordance with the changed cam lobe position, e.g., a sliding camshaft may move from a high lift cam lobe position to a low lift cam lobe position, which in turn will cause the engine operation to be different.

Thus, the sliding camshaft actuator is an important component in the proper operation of a VVL sliding camshaft system, particularly the actuator's pin extension into, and retraction from, the displacement grooves into the camshaft barrels. If an extended actuator pin is only partially retracted for any reason then a subsequent shift command could result in the partially retracted pin being broken off or some other damage caused to the sliding camshaft system. Thus, there is a need for a reliable means of ensuring that a partially extended actuator pin can be caused to fully retract to prevent damage to the sliding camshaft system.

BRIEF SUMMARY

One or more exemplary embodiments address the above issue by providing a method for retracting a partially extended sliding camshaft actuator pin.

According to an aspect of an exemplary embodiment, a method for retracting a partially extended pin of a sliding camshaft actuator having first and second pins being selectively actuatable by adjacent first and second magnetic field generating coils includes determining if the first or the second pin of the sliding camshaft actuator is partially extended after engine ignition. Still another aspect according to the exemplary embodiment includes energizing the first magnetic field generating coil of the sliding camshaft actuator when the second pin is partially extended. And another aspect includes retracting the partially extended second pin with flux linkage created by the first magnetic field generating coil being coupled unto the second magnetic field generating coil and the second pin. And yet another aspect of the exemplary embodiment includes energizing the second magnetic field generating coil of the sliding camshaft actuator when the first pin is partially extended. And still another aspect includes retracting the partially extended first pin with flux linkage created by the second magnetic field generating coil being coupled unto the first magnetic field generating coil and the first pin.

Still another aspect of the exemplary embodiment includes detecting a position of a three step intake sliding camshaft. And another aspect wherein the three step intake sliding camshaft comprises at least one position indicator barrel. And a further aspect wherein the three step intake sliding camshaft further comprises high lift lobe, low lift lobe, and deactivate lobe positions. Yet a further aspect wherein detecting further comprises using a Hall Effect sensor for detecting position of the three step intake sliding camshaft. And still another aspect in accordance with the embodiment wherein detecting further comprises sensing position identifying tracks configured on the at least one position indicator barrel.

Another aspect in accordance with the exemplary embodiment wherein retracting occurs when a partially extended pin is aligned over a low lift lobe position.

And another aspect wherein energizing occurs when the at least one position indicator barrel is positioned to prevent a retracted pin from partially extending.

BRIEF DESCRIPTION OF THE DRAWINGS

The present exemplary embodiment will hereinafter be described in conjunction with the following drawing figures, wherein like numerals denote like elements.

DETAILED DESCRIPTION

The following detailed description is merely exemplary in nature and is not intended to limit the embodiment or the application and uses thereof. Furthermore, there is no intention to be bound by any theory presented in the preceding background or the following detailed description.

Figure 1:
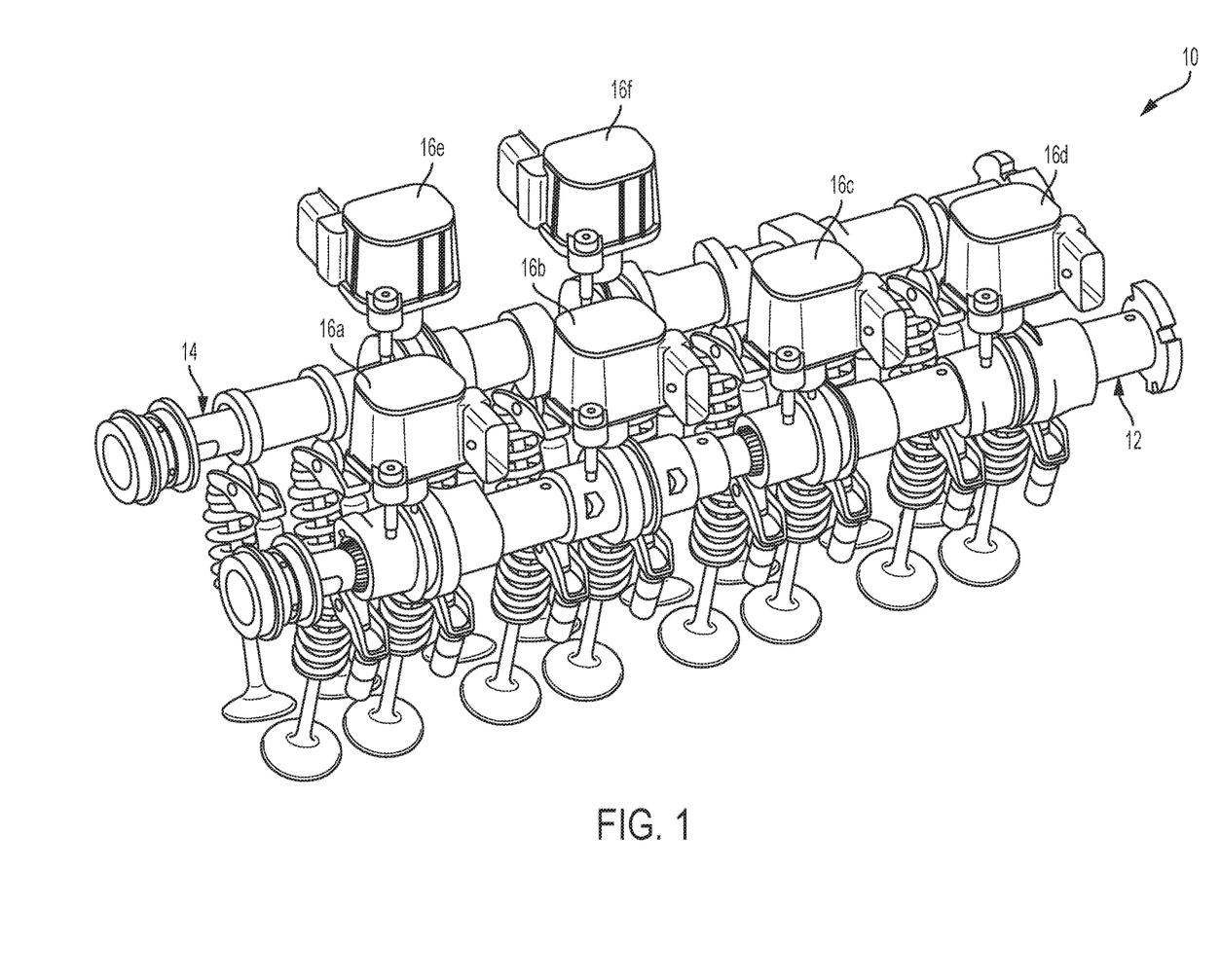
FIG. 1 is an illustration of an intake and an exhaust sliding camshaft configuration for a 4 cylinder internal combustion engine in accordance with aspects of an exemplary embodiment.

In accordance with the disclosed embodiment, FIG. 1 is an illustration of an intake and an exhaust sliding camshaft configuration for a 4 cylinder internal combustion engine camshaft system 10 in accordance with aspects of an exemplary embodiment. It is appreciated that the 4 cylinder embodiment is merely exemplary and the concept of sliding camshaft barrel position sensing may be applied to other multiple cylinder engine camshaft system configurations, e.g., 5, 6, 8, 9, or 12, without exceeding the scope of the invention.

The camshaft system 10 includes at least one sliding camshaft having at least one camshaft barrel. In the case, the camshaft system 10 includes a three (3) step intake sliding camshaft 12 and a two (2) step exhaust sliding camshaft 14. For shifting the position of the three step intake 12 and two step exhaust 14 sliding camshafts, at least one camshaft actuator 16 is provided in selective communication to the camshafts and commanded on and off by a control module, e.g., engine control module (not shown). Particular to this embodiment, camshaft system 10 includes a plurality of actuators (16a-16f) with actuators (16a-16d) being operative for shifting the three step intake sliding camshaft 12, and actuators (16e-16f) being operative for shifting the two step exhaust sliding camshaft 14 when commanded by the controller.

Figure 2:
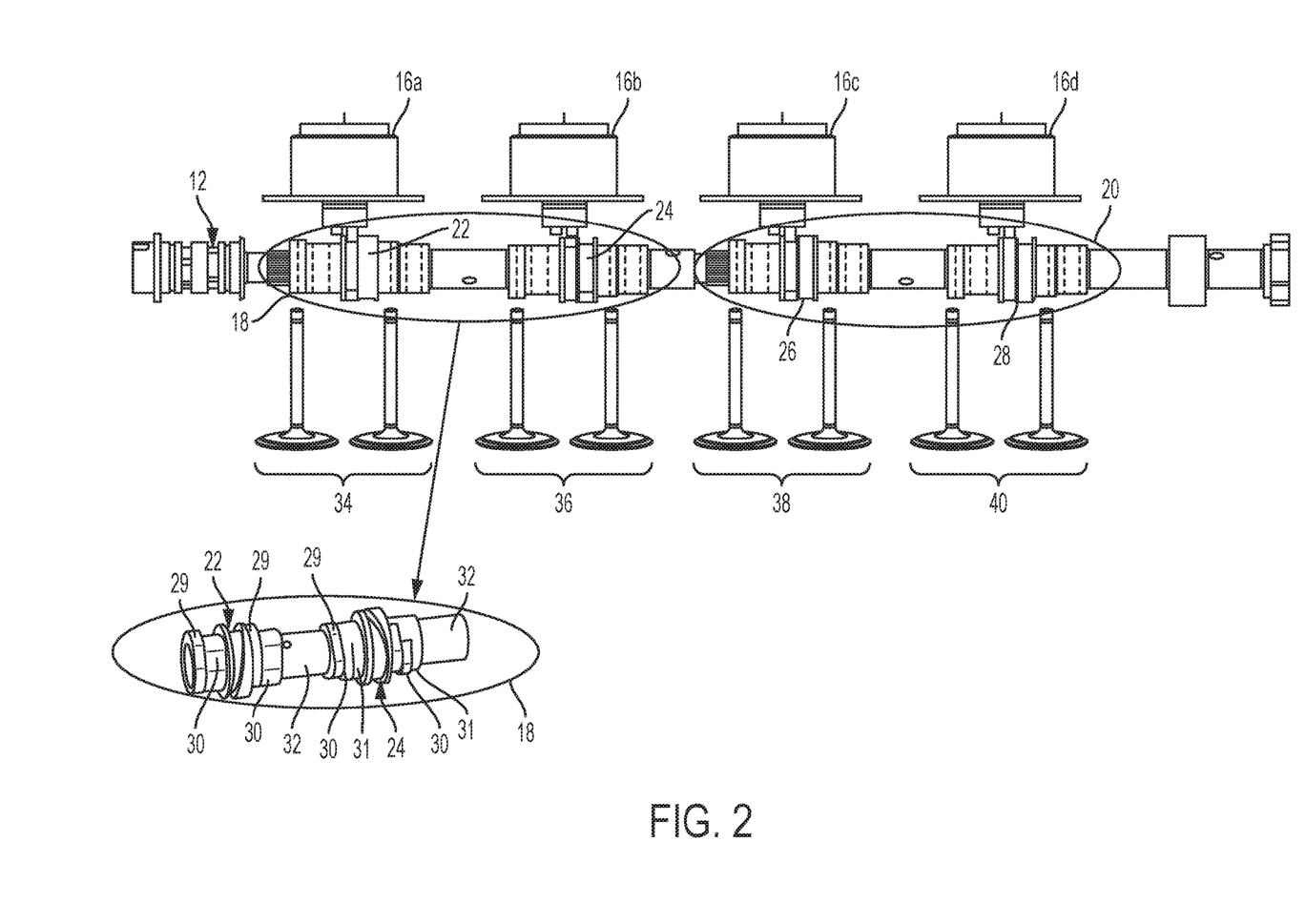
FIG. 2 is an illustration of an intake sliding camshaft configuration with position shifting camshaft actuators in accordance with aspects of the exemplary embodiment.

Referring now to FIG. 2, the three step intake sliding camshaft 12 includes two sliding lobe assemblies, 18 and 20. Each sliding lobe assembly (18, 20) includes at least one position indicator camshaft barrel. Position indicator camshaft barrels 22 and 24 are fixed on the sliding lobe assembly 18, and the position indicator camshaft barrels 26 and 28 are fixed to sliding lobe assembly 20 in accordance with the exemplary embodiment. Referring to the enlarged view of the sliding lobe assembly 18 of the three step sliding intake camshaft 12, included is a high lift cam lobe position 29, a low lift cam lobe position 30, and a deactivated cam lobe position 31 for providing the three steps of the camshaft in accordance with the exemplary embodiment. The high lift cam lobe position 29 refers to the air intake valves (34-40) being opened to the maximum position each time the three step intake sliding camshaft 12 rotates 360° while in this lobe position. The low lift cam lobe position 30 refers to the air intake valves being opened to a less than maximum lobe position each time the intake sliding camshaft 12 rotates 360° and the deactivated cam lobe position 31 refers to the air intake valves not be opened at all each time the three step intake sliding camshaft 12 rotates 360°. The three step intake sliding camshaft 12 also includes pipe journals 32 for at least maintaining spacing between sliding lobes.

Figure 3:
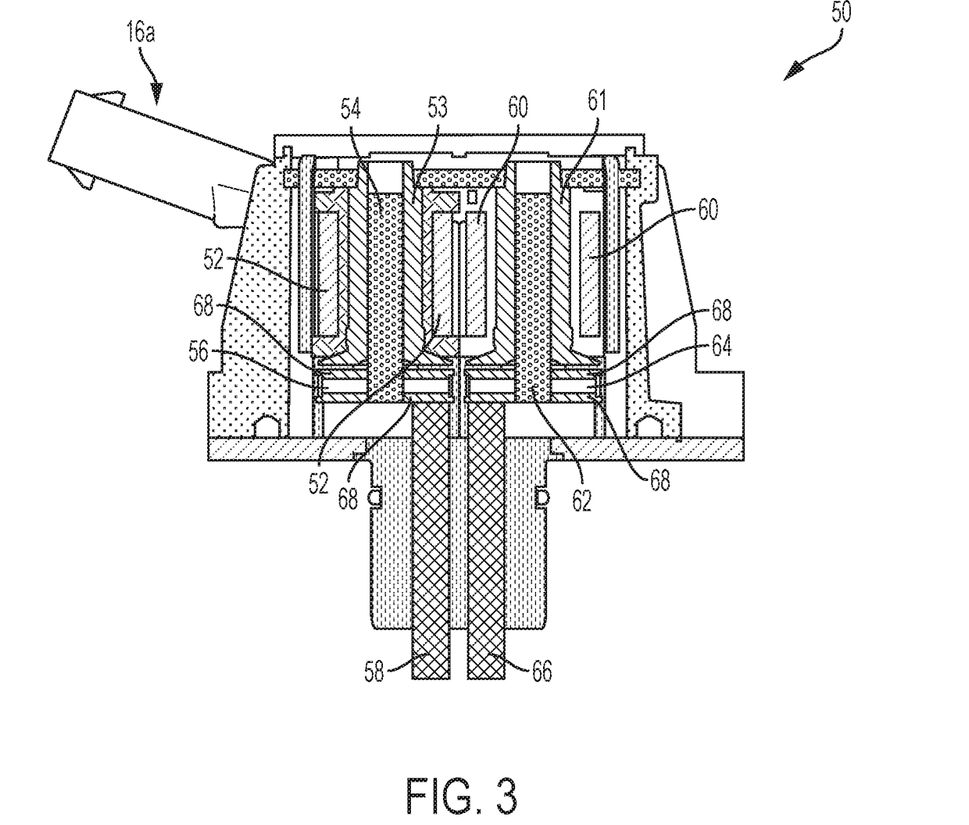
FIG. 3 is an illustration of a cross sectional view of a sliding camshaft actuator in accordance with aspects of the exemplary embodiment.

Referring now to FIG. 3, an illustration 50 of a cross sectional view of a sliding camshaft actuator (16a) is provided in accordance with aspects of the exemplary embodiment. The sliding camshaft actuator 16a includes a first magnetic field generating coil 52 wound on a spool 53 that shrouds a sliding armature 54 within its core. A magnet 56 is disposed between metal plates 68 and fixed at a bottom end of the sliding armature 54. The first magnetic field generating coil 52, the sliding armature 54, and magnet 56 are operative to cause a first actuator pin 58 to be extended into a camshaft barrel as necessary for purposes of shifting the position of the three step intake sliding camshaft 12 in accordance with aspects of the exemplary embodiment.

The sliding camshaft actuator 16a also includes a second magnetic field generating coil 60 wound on a spool 61 that shrouds another sliding armature 62. A second magnet 64 is also disposed between metal plates 68 and fixed at a bottom end of the sliding armature 62. The second magnetic field generating coil 60, the sliding armature 62, and magnet 64 are operative to cause a second actuator pin 66 to be extended into a camshaft barrel as necessary for purposes of shifting the position of three step sliding intake camshaft 12 in accordance with the exemplary embodiment.

Figure 4A:
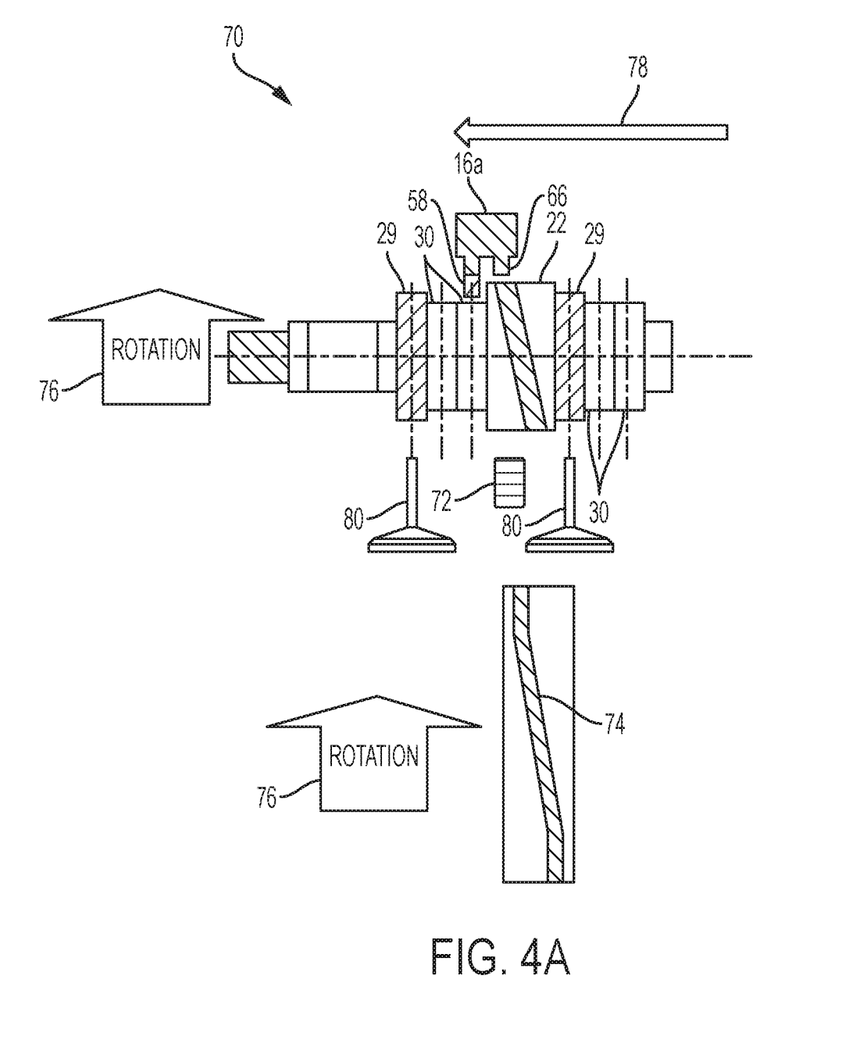
FIG. 4a is an illustration of a portion of an intake sliding camshaft including a camshaft actuator with a partially extended pin aligned over a low lift cam lobe in accordance with aspects of the exemplary embodiment.

Referring now to FIG. 4a, an illustration 70 of a portion of a three step intake sliding camshaft 12 including a camshaft actuator 16a with a partially extended pin 58 aligned over a low lift cam lobe 30 is provided in accordance with aspects of the exemplary embodiment. A position detection sensor 72 is operative to detect the position of the three step intake sliding camshaft 12 by sensing position identifying tracks (not shown) configured on the at least one position indicator barrel 22. For example, after engine ignition the position detection sensor 72 will detect a position identifying track on the at least one position indicator barrel 22 that indicates the three step intake sliding camshaft 12 is in a high lift cam lobe position 29 for actuating intake valves 80. When the intake sliding camshaft 12 is commanded to shift position, another position identifying track may indicate that the three step intake sliding camshaft 12 is in a low lift cam lobe position 30.

In accordance with the exemplary embodiment, the position detection sensor 72 operates to indicate when the three step intake sliding camshaft 12 is in a position where a potential exists for a partially extended actuator pin 58 can be aligned over a low lift cam lobe 30. In such case, it is probable that the partially extended actuator pin will be bent or fractured when the three step intake sliding camshaft 12 is commanded to shift toward direction 78 such that an intake valves 80 are transitioned from a high lift cam lobe position 29 to a low lift cam lobe position 30.

Figure 4B:
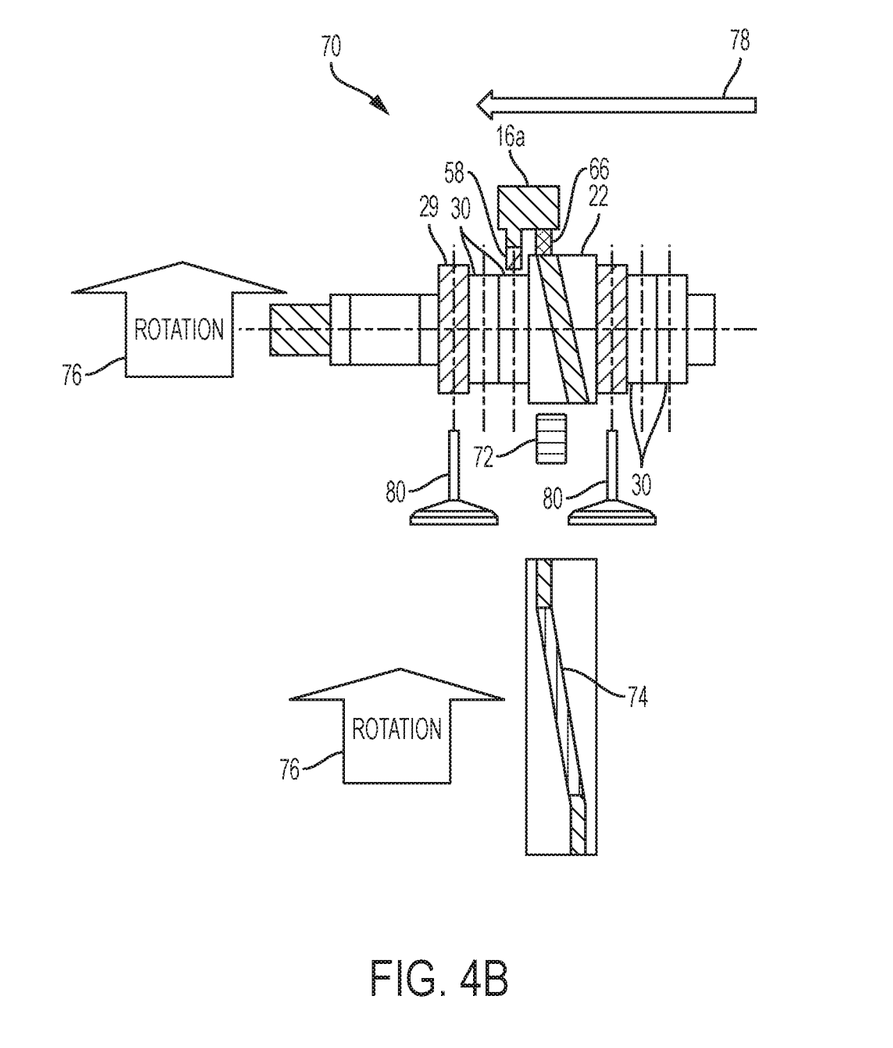
FIG. 4b is an illustration of a portion of an intake sliding camshaft in transition from a high lift cam lobe position to low lift cam lobe position including a camshaft actuator with a partially extended pin in accordance with aspects of the exemplary embodiment.
Figure 4C:
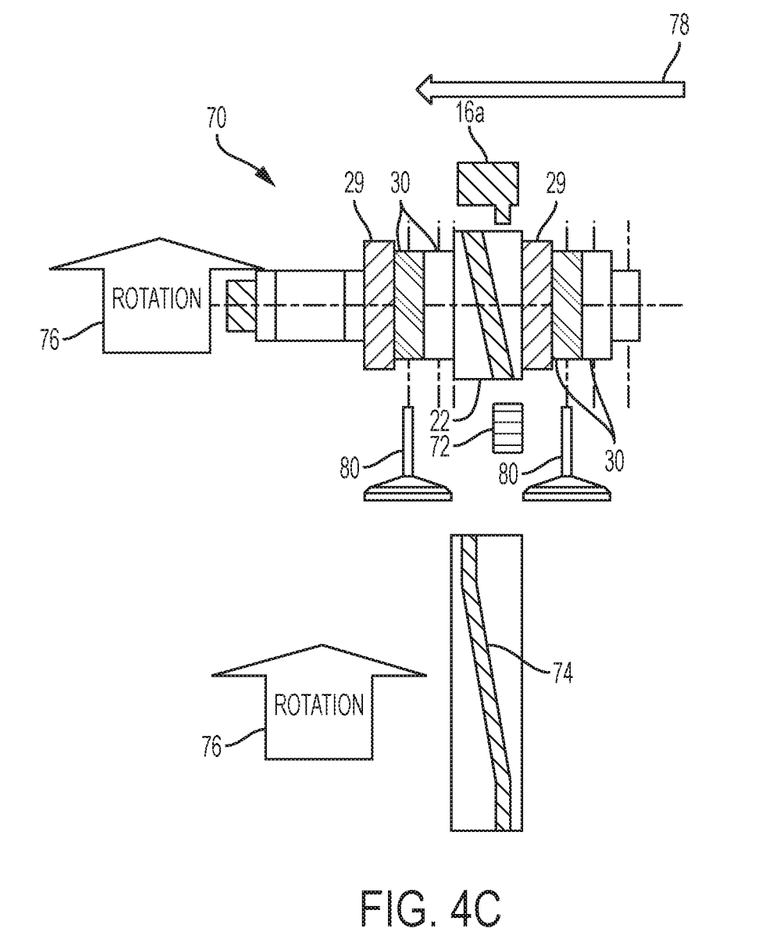
FIG. 4c is an illustration of a portion of an intake sliding camshaft after the partially extended actuator pin fractured during the transition from the high lift lobe position to the low lift valve position in accordance with aspects of the exemplary embodiment.

In FIG. 4b, an illustration of a portion of an intake sliding camshaft 12 in transition from a high lift cam lobe position 29 to low lift cam lobe position 30 in accordance with aspects of the exemplary embodiment is provided. As the intake sliding camshaft 12 rotates in the direction 76, the sliding camshaft actuator 16a has a partially extended pin 58 aligned over a low lift cam lobe 29. The sliding camshaft actuator 16a is commanded to extend pin 66 into a displacement groove 74 to cause the three step intake sliding camshaft to shift the valves 80 from a high lift cam lobe position 29 to a low cam lobe position 30. As the sliding lobe assembly 18 begins to move in direction 78, the partially extended actuator pin 58 is subjected to a force from the position indicator barrel 22. As shown in FIG. 4c, the increasing force on the partially extended pin 58 from the position indicator barrel 22 causes it to bend and ultimately fracture such that the actuator would have to be replaced. Also, the actuator pin 66 is subjected to a bending force while disposed in the displacement groove 74 causing further damage to the camshaft actuator 16a.

Figure 5:
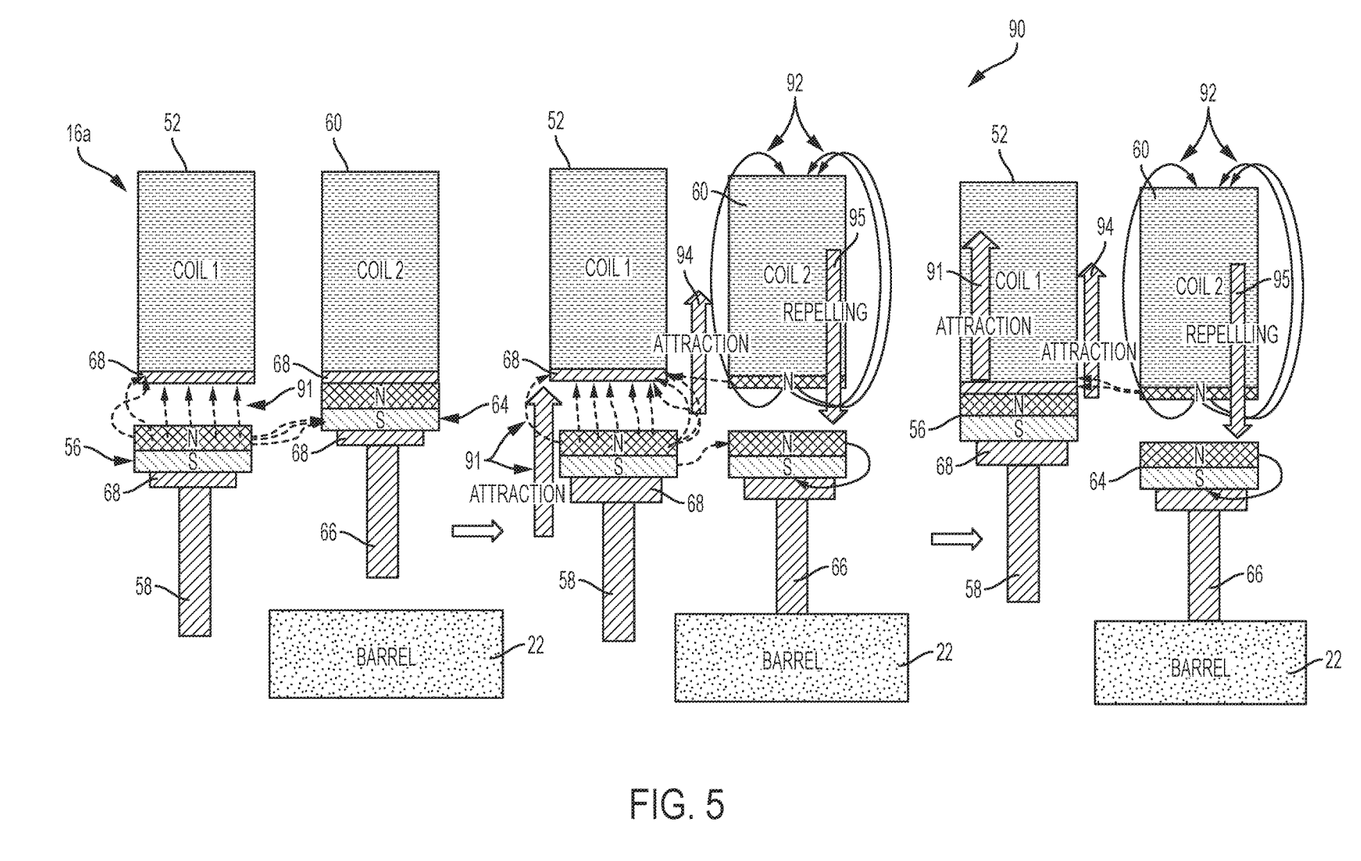
FIG. 5 is an illustration of a functional view of a sliding camshaft actuator with a partially extended pin being retracted by an additional magnetic force generated by the energized adjacent coil in accordance with aspects of the exemplary embodiment.

Referring to FIG. 5, an illustration 90 of a functional view of a sliding camshaft actuator 16a with a partially extended pin being retracted in accordance with aspects of the exemplary embodiment is provided. From left to right, the camshaft actuator 16a is shown having a partially extended first pin 58 while a second pin 66 is in a fully retracted position over the position indicator barrel 22. After the engine is ignited, the position detection sensor 72 (not shown) detects the position of position indicator barrel 22 to determine when the three step intake sliding camshaft 12 is in a position where there is a potential for a partially extended pin condition to exist. Neither of the first magnetic field generating coil 52 nor second magnetic field generating coil 60 are energized in this instance. But, there is a magnetic attraction force 91 between the magnet 56 and the metal plate 68 of the first magnetic field generating coil 52. However, the magnetic attraction force 91 is not strong enough to retract the partially extended pin 58.

Therefore, when it is determined that a potential for a partially extended pin condition exists, in order to cause the partially extended first pin 58 to retract, the second magnetic field generating coil 60 is energized to create magnetic field flux linkage 92 with the first magnetic field generating coil 52 and the partially extended pin 58 such that an additional magnetic attraction force 94 is imposed on the partially extended actuator pin 58 causing it to move to the fully retracted position. When the second magnetic field generating coil 60 is energized, it creates a repelling force 95 which is directed onto the magnet 64 influencing the actuator pin 66 to attempt to extend outward. However, the second actuator pin 66 is aligned over the position indicator barrel 22 such that it will not extend or will be extended into the displacement groove 74 and be moved back into a full retracted position when it exits the displacement groove 74 and the second magnetic field generation coil 60 is de-energized.

Figure 6:
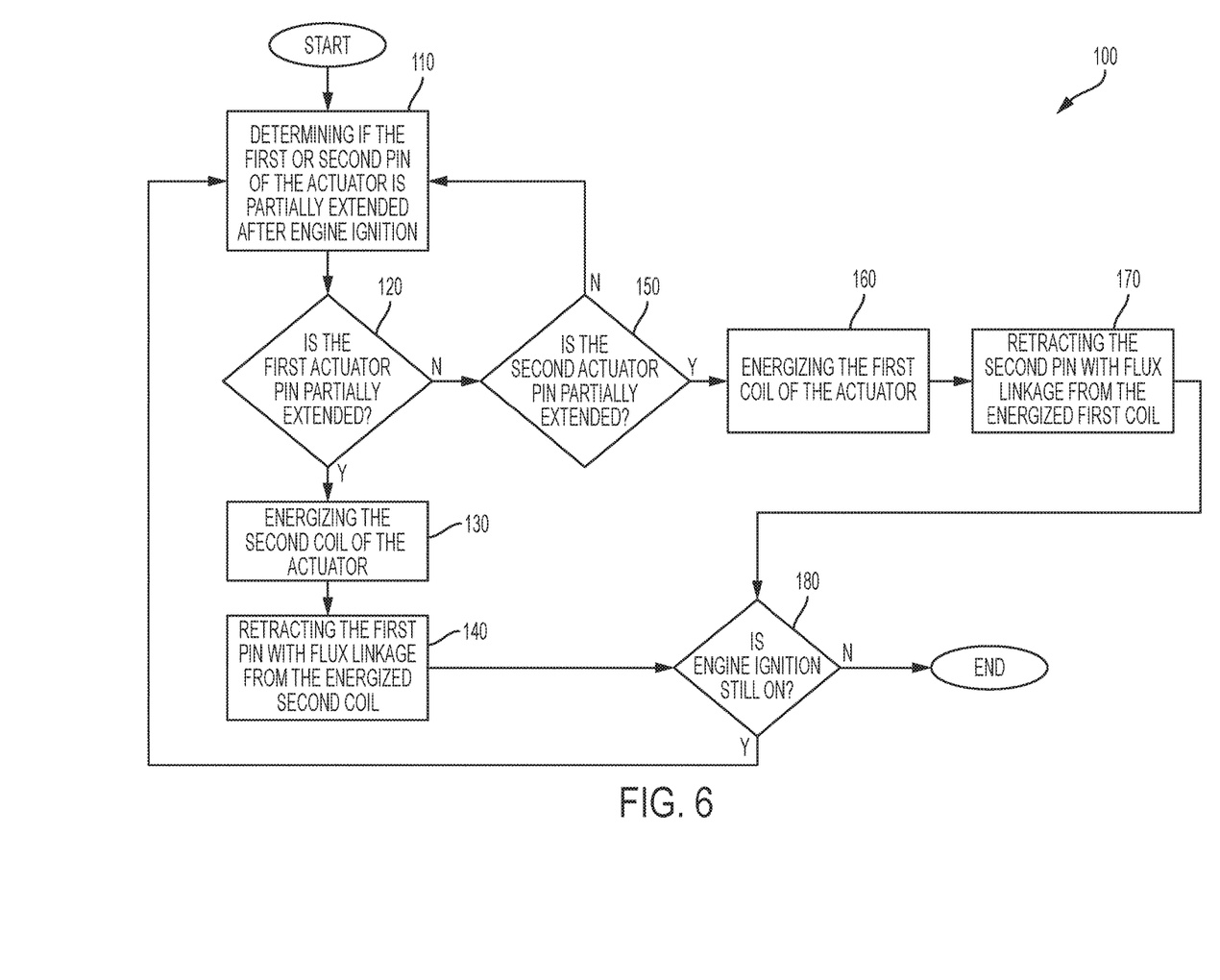
FIG. 6 is an illustration of an algorithm for retracting a partially extended sliding camshaft actuator pin in accordance with the exemplary embodiment.

Referring now to FIG. 6, an illustration of an algorithm 100 for retracting a partially extended sliding camshaft actuator pin in accordance with the exemplary embodiment is provided. At block 110, the method begins with determining if a first or second pin of a camshaft actuator is partially extended after engine ignition using the three step intake sliding camshaft position detection sensor. At block 120, if it is determined by the position detection sensor that a potential exists for the first actuator pin to be extended then the method proceeds to block 130 for energizing the second magnetic field generating coil, and then to block 140 for retracting the first actuator pin with flux linkage being created by the energized second magnetic field generating coil being coupled onto the first magnetic field generating coil and the partially extended first pin.

At block 150, if it is determined by the position detection sensor that a potential exists for the second actuator pin to be extended then the method proceeds to block 160 for energizing the first magnetic field generating coil, and then to block 170 for retracting the second actuator pin with flux linkage being created by the energized first magnetic field generating coil being coupled onto the second magnetic field generating coil and the partially extended second pin.

At block 180, the method continues with determining if the engine ignition is still on. If the engine ignition is still on then the method continues returns to block 110 to repeat the process. If the ignition is turned off then the process ends until the next engine ignition.

The detailed description provides those skilled in the art with a convenient road map for implementing the exemplary embodiment or exemplary embodiments. Many modifications and variations will be apparent to those of ordinary skill in the art without departing from the scope and spirit of the invention. While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for retracting a partially extended pin of a sliding camshaft actuator having first and second pins being selectively actuatable by adjacent first and second magnetic field generating coils comprising:
    determining if the first or the second pin is partially extended after engine ignition;
    energizing the first magnetic field generating coil of the sliding camshaft actuator when the second pin is partially extended;
    retracting the partially extended second pin with flux linkage created by the first magnetic field generating coil being coupled unto the second magnetic field generating coil and the second pin;
    energizing the second magnetic field generating coil of the sliding camshaft actuator when the first pin is partially extended; and
    retracting the partially extended first pin with flux linkage created by the second magnetic field generating coil being coupled unto the first magnetic field generating coil and the first pin.

2. The method of claim 1 further comprises detecting a position of a three step intake sliding camshaft.

3. The method of claim 2 wherein the three step intake sliding camshaft comprises at least one position indicator barrel.

4. The method of claim 3 wherein the three step intake sliding camshaft further comprises high lift lobe, low lift lobe, and deactivate lobe positions.

5. The method of claim 4 wherein detecting further comprises using a Hall Effect sensor for detecting position of the three step intake sliding camshaft.

6. The method of claim 5 wherein detecting further comprises sensing position identifying tracks configured on the at least one position indicator barrel.

7. The method of claim 6 wherein retracting occurs when a partially extended pin is aligned over a low lift lobe position.

8. The method of claim 7 wherein energizing occurs when the at least one position indicator barrel is positioned to prevent a retracted pin from partially extending.

9. A method for retracting a partially extended pin of a sliding camshaft actuator having first and second pins being selectively actuatable by adjacent first and second magnetic field generating coils comprising:
    detecting a position of a three step intake sliding camshaft after engine ignition wherein the three step intake sliding camshaft includes high lift lobe, low lift lobe, and deactivate lobe positions;
    retracting a partially extended second pin with flux linkage created by the first magnetic field generating coil being coupled unto the second magnetic field generating coil and the second pin when the second pin is aligned over a low lift lobe position; and
    retracting a partially extended first pin with flux linkage created by the second magnetic field generating coil being coupled unto the first magnetic field generating coil and the first pin when the first pin is aligned over a low lift lobe position.

10. The method of claim 9 further comprises energizing the first magnetic field generating coil of the sliding camshaft actuator when the second pin is partially extended.

11. The method of claim 10 further comprises energizing the second magnetic field generating coil of the sliding camshaft actuator when the first pin is partially extended.

12. The method of claim 11 wherein the three step intake sliding camshaft comprises at least one position indicator barrel.

13. The method of claim 12 wherein detecting further comprises using a Hall Effect sensor for detecting position of the three step intake sliding camshaft.

14. The method of claim 13 wherein using a Hall Effect sensor further comprises sensing position identifying tracks configured on the at least one position indicator barrel.

15. The method of claim 12 energizing occurs when the at least one position indicator barrel is positioned to prevent a retracted pin from partially extending.

* * * * *